(12) United States Patent  (10) Patent No.: US 7,901,730 B2
Johnson et al.  (45) Date of Patent: Mar. 8, 2011

(54) THIN FILM CERAMIC PROTON CONDUCTING ELECTROLYTE

(75) Inventors: Lonnie G. Johnson, Atlanta, GA (US); Davorin Babic, Marietta, GA (US)

(73) Assignee: Johnson Research & Development Co., Inc., Atlanta, GA (US)

( * ) Notice: Subject to any disclaimer, the term of this patent is extended or adjusted under 35 U.S.C. 154(b) by 574 days.

(21) Appl. No.: 11/113,537

(22) Filed: Apr. 25, 2005

(65) Prior Publication Data

US 2005/0238895 A1  Oct. 27, 2005

Related U.S. Application Data

(60) Provisional application No. 60/565,305, filed on Apr. 26, 2004.

(51) Int. Cl.
*B05D 5/12* (2006.01)
*B05D 3/02* (2006.01)

(52) U.S. Cl. ...................... 427/115; 427/372.2
(58) Field of Classification Search .................. 427/115, 427/372.2, 430.1
See application file for complete search history.

(56) References Cited

U.S. PATENT DOCUMENTS

| | | | |
|---|---|---|---|
| 4,040,410 A | 8/1977 | Libowitz | 126/270 |
| 4,049,877 A | 9/1977 | Saillant et al. | 429/11 |
| 4,098,958 A | 7/1978 | Bettman | 429/17 |
| 4,422,500 A | 12/1983 | Nishizaki et al. | 165/104.12 |
| 4,523,635 A | 6/1985 | Nishizaki et al. | 165/104.12 |
| 4,562,511 A | 12/1985 | Nishino et al. | 361/324 |
| 4,677,038 A | 6/1987 | Salomon | 429/11 |
| 4,692,390 A | 9/1987 | Roy | 429/17 |
| 4,781,029 A | 11/1988 | SerVaas | 60/641.7 |
| 4,818,638 A | 4/1989 | Roy | 429/20 |
| 5,139,895 A | 8/1992 | Roy et al. | 429/17 |
| 5,306,577 A | 4/1994 | Sprouse | 429/17 |
| 5,336,573 A | 8/1994 | Zuckerbrod et al. | 429/252 |
| 5,436,091 A | 7/1995 | Shackle et al. | 429/192 |
| 5,498,489 A | 3/1996 | Dasgupta et al. | 424/152 |
| 5,532,074 A | 7/1996 | Golben | 429/53 |
| 5,540,741 A | 7/1996 | Gozdz et al. | 29/623.5 |
| 5,547,782 A | 8/1996 | Dasgupta et al. | 429/194 |
| 5,571,634 A | 11/1996 | Gozdz et al. | 429/192 |
| 5,584,893 A | 12/1996 | Mitchell | 29/623.5 |
| 5,588,971 A | 12/1996 | Fauteux et al. | 29/623.5 |
| 5,591,544 A | 1/1997 | Fauteux et al. | 429/209 |
| 5,597,659 A | 1/1997 | Morigaki et al. | 429/190 |
| 5,778,515 A | 7/1998 | Menon | 28/623.4 |
| 5,928,436 A | 7/1999 | Borkowski et al. | 136/205 |
| 6,033,796 A | 3/2000 | Baji | 429/59 |
| 6,368,383 B1 * | 4/2002 | Virkar et al. | 95/54 |
| 6,899,967 B2 | 5/2005 | Johnson | 429/19 |

(Continued)

FOREIGN PATENT DOCUMENTS

EP  0 055 855  7/1982

(Continued)

*Primary Examiner* — Brian K Talbot
(74) *Attorney, Agent, or Firm* — Baker Donelson

(57) ABSTRACT

A thin film ceramic proton conducting electrolyte assembly (10) is provided having a includes a nanoporous, copper supporting substrate (11), a temporary substrate pore filler material (12), and a ceramic electrolyte layer (13) positioned upon the substrate (11). The ceramic electrolyte layer may be made of a yttrium doped strontium zirconate. To produce the electrolyte the substrate pores (14) are filled with the pore filler material to provide a smooth surface upon which the electrolyte layer is deposited. The filler material is then removed from the pores and the substrate and electrolyte layer are annealed.

11 Claims, 2 Drawing Sheets

U.S. PATENT DOCUMENTS

| | | | |
|---|---|---|---|
| 7,033,637 B1 * | 4/2006 | Hunt et al. | 427/77 |
| 2002/0012824 A1 | 1/2002 | Johnson | 429/17 |
| 2002/0020298 A1 * | 2/2002 | Drost et al. | 96/11 |
| 2002/0064692 A1 | 5/2002 | Johnson | 429/11 |
| 2005/0013933 A1 * | 1/2005 | Chen et al. | 427/181 |

FOREIGN PATENT DOCUMENTS

| | | | |
|---|---|---|---|
| EP | 0 071 271 | | 2/1983 |
| EP | 0 168 062 | | 1/1986 |
| GB | 1357347 | * | 6/1974 |
| JP | 58-147575 | * | 9/1983 |

* cited by examiner

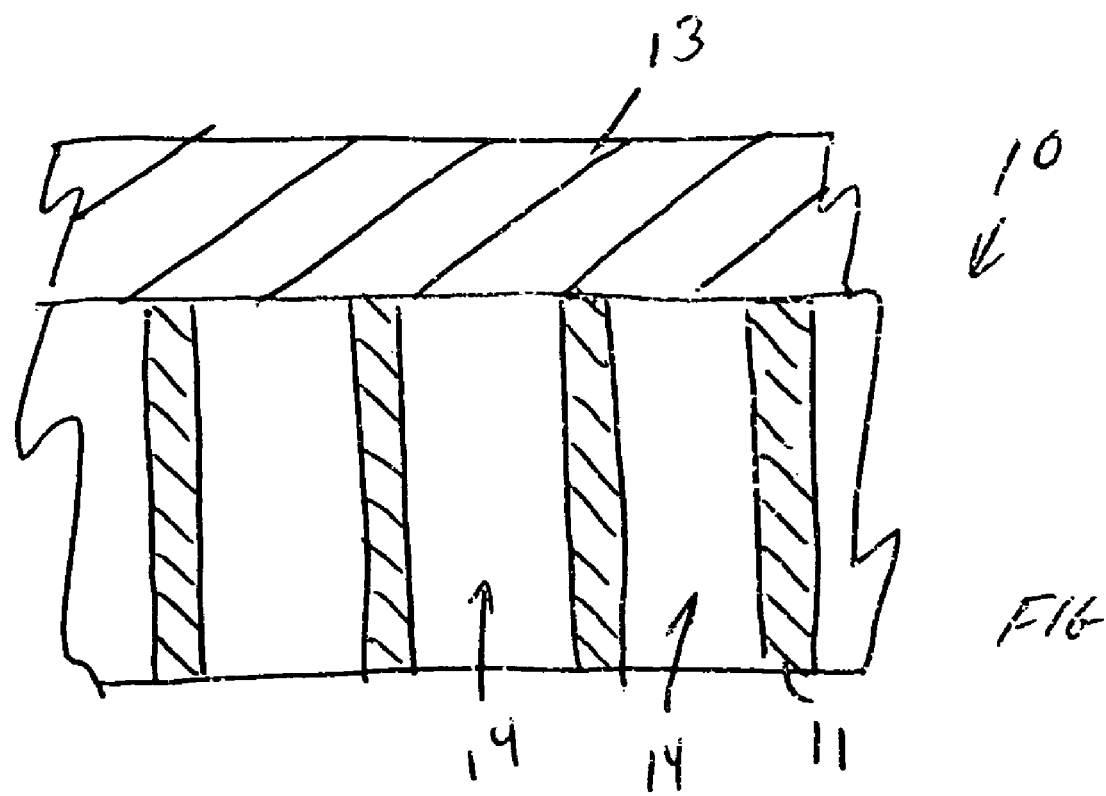

THIN FILM CERAMIC PROTON CONDUCTING ELECTROLYTE

REFERENCE TO RELATED APPLICATION

This claims benefit of provisional of U.S. Patent Application Ser. No. 60/565,305 filed Apr. 26, 2004.

TECHNICAL FIELD

This invention relates generally to electrolytes, and more particularly to ceramic electrolytes.

BACKGROUND OF THE INVENTION

The present invention relates to proton conducting electrolytes which are prepared for use in intermediate temperature range fuel cells and other electrochemical devices that operate in the temperature range of between 200° C. to 600° C.

Proton conducting electrolytes are a core component of any electrochemical device based on proton conduction such as, for example, fuel cells, hydrogen separation and pumping devices, etc. It is well known that presently there are no proton conducting material with proton conductivity high enough to successfully operate in the intermediate temperature range (200-600° C.) when prepared by current material preparation techniques that result in an electrolyte layer at least 10 μm thick. The polymer based electrolytes, such as Nafion or PBI, are know to operate in a temperature of below 200° C., as a temperature above such destroys the polymer electrolyte. Perovskite ceramic electrolytes such as zirconates and cerates must operate at very high temperatures as their conductivities are not high enough until the temperature reaches approximately 600° C. Hence, no suitable electrolyte is found for the intermediate temperature range of between 200° C. and 600° C.

However, it is desirous to develop an electrolyte which may operate within the intermediate temperature range as it solves many outstanding problems of lower temperature systems, especially fuel cells, while avoiding high operating temperature induced mechanical and thermal mismatch problems. It thus is seen that a need remains for an intermediate temperature electrolyte and a method of producing such which overcomes problems associated with those of the prior art. Accordingly, it is to the provision of such that the present invention is primarily directed.

SUMMARY OF THE INVENTION

In a preferred form of the invention, a thin film proton conducting electrolyte comprises a nanoporous supporting substrate, and a ceramic layer positioned upon the porous supporting substrate stack, the ceramic layer having a thickness less than or equal to 2 microns.

In another preferred form of the invention, a method of manufacturing a proton conducting electrolyte comprises the steps of (a) providing a nanoporous supporting substrate, (b) filling the nanopores of the nanoporous supporting substrate with a filler material, and (c) depositing a ceramic layer upon the filled nanoporous supporting substrate.

BRIEF DESCRIPTION OF THE DRAWINGS

FIGS. 1-4 are a series of cross-sectional views illustrating the method of producing an electrolyte in a preferred embodiment.

DETAILED DESCRIPTION

With reference next to the drawings, there is shown in a method of producing a ceramic proton conducting electrolyte assembly 10 for use in intermediate temperature range devices, such as fuel cells, hydrogen separation and pumping devices, and other electrochemical devices.

The electrolyte assembly 10 includes a nanoporous supporting substrate 11, a temporary substrate pore filler material 12, and a ceramic electrolyte layer 13 positioned upon the substrate 11. The nanoporous substrate 11 may be made of a copper layer produced in accordance with the teachings of U.S. Patent Application Ser. No. 10/918,250, now U.S. Pat. No. 6,986,838, which is commonly owned and specifically incorporated herein by reference. The substrate pore filler material 12 may be a photoresist or polymer material, such as AZ P4620 made by Clariant or Microposit S 1813 made by Shipley. The ceramic electrolyte layer 13 is preferable a yttrium doped strontium zerconate ($Y:SrZrO_3$), but may also be barium zerconate, strontium cerate, barium cerate, or other proton conductive perovskite ceramic materials.

Figure 1:
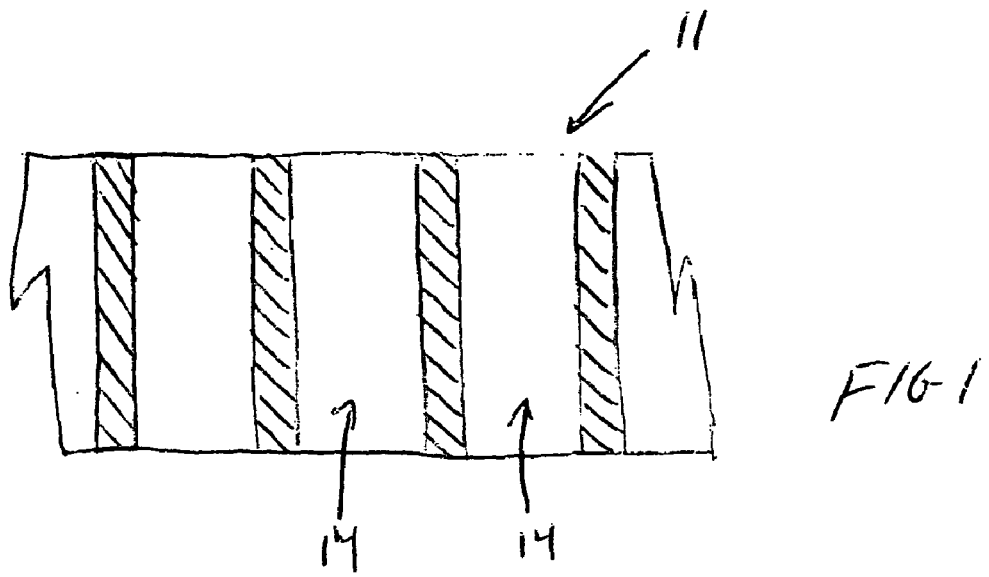

The electrolyte assembly 10 is preferable manufactured in the following manner. An approximately 10 micron layer of porous copper substrate 11 is produced or otherwise provided having a pore size of approximately 200 nm, as shown in FIG. 1. The pores 14 allow unimpeded transport of the reactant gasses to the electrolyte surface. It is believed that the substrate pore diameter be smaller or equal to the electrolyte thickness to prevent cracking of the electrolyte due to long unsupported spans of the electrolyte material. A nanoporous substrate of 200 nm is believed to provide this support while allowing gas flow through the pores to the interface between the substrate 11 and the electrolyte layer 13.

Figure 2:
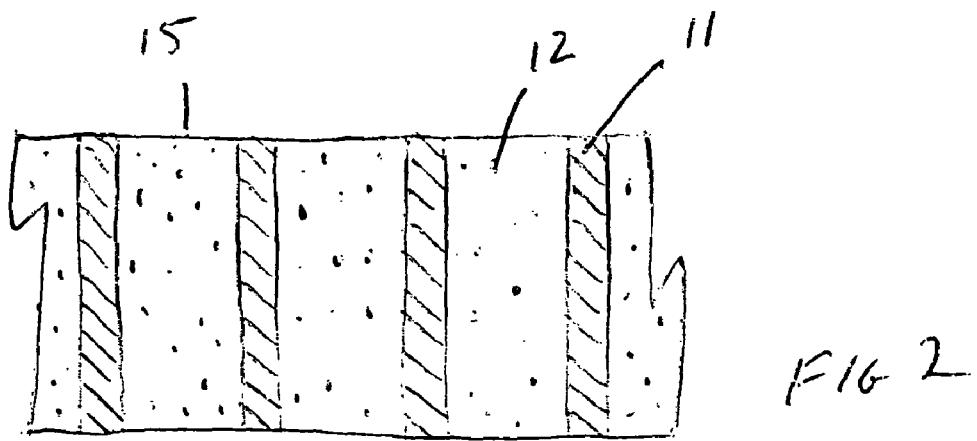
Figure 3:
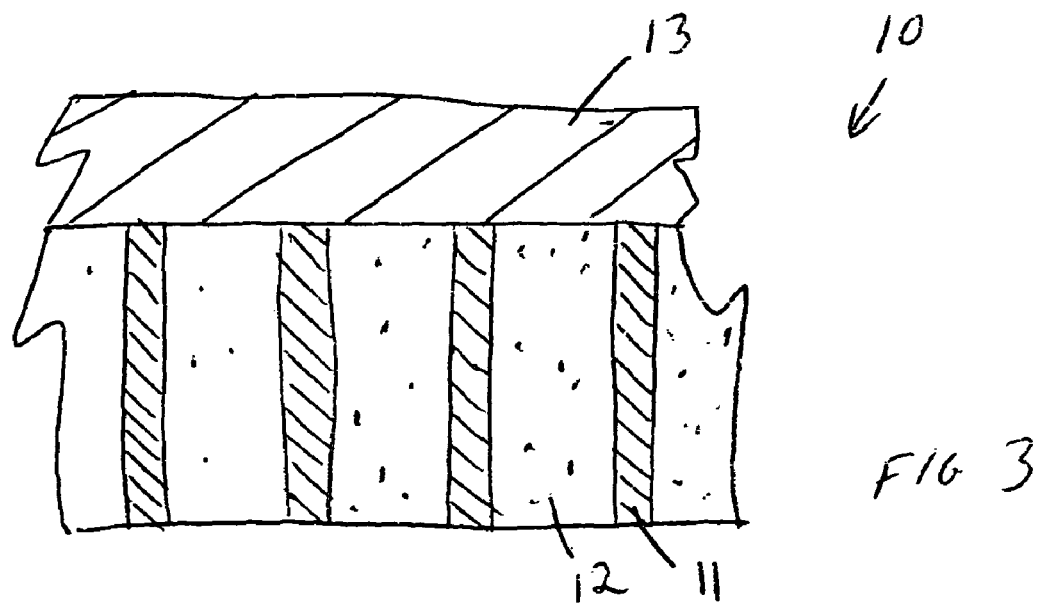

Once the nanoporous substrate 11 is produced, the pores 14 are filled with a pore filler material 12 to provide the substrate 11 with a smooth and uniform top surface 15, as shown in FIG. 2. The electrolyte layer 13 is then deposited upon the top surface 15 of the substrate 11 by RF sputtering, as shown in FIG. 3. The sputtering process is equivalent to other methods of chemical and physical vapor deposition, i.e. reactive sputtering or reactive evaporation, such as various chemical vapor depositions, spray pyrolysis, laser ablation, ion beam evaporation, sol-gel, or the like. As such, as used herein the terms deposited refers to any such conventional means of forming a layer. Preferable, the electrolyte layer 13 is deposited to a thickness equal to or less than 2 microns. Through RF sputtering, the deposition of a strontium zirconate layer of 350 nm may be conducted with the following parameters: plasma power=60 W, argon flow rate=50 sccm, operating pressure=2.7 mTorr, deposition time=1 hour.

Once the electrolyte layer 13 is deposited the pore filler material 12 is removed by an appropriate solvent, such as acetone or an alcohol, as shown in FIG. 4. The substrate and electrolyte layer are then annealed at a temperature of between 550° C. and 800° C. for approximately one hour in an inert atmosphere. The final or resulting product is a proton conducting electrolyte that allows a reactant gas to pass through the substrate/electrode and very thin electrolyte layer, resulting in high conductance while operational within the intermediate temperature range of electrochemical devices.

It should be understood that other dopants may be used as an alternative to the yttrium, such as indium, neodymium, scandium, or other similar material. It should also be understood that other material may be utilized to produce the substrate 11 as an alternative to the copper disclosed in the preferred embodiment. It should be understood that it is believed that the pore filler material 12 should be removed from the pores 14. However, should an very high proton conducting material is utilized or discovered it may be conceivable that the filler material need not be removed.

It thus is seen that a proton conducting electrolyte for use with intermediate temperature fuel cells or other electrochemical devices is now provided which overcomes problems associated with those of the prior art. It should of course be understood that many modifications may be made to the specific preferred embodiment described herein without departure from the spirit and scope of the invention as set forth in the following claims.

The invention claimed is:

1. A method of manufacturing a proton only conducting electrolyte comprising the steps of:
   (a) providing a nanoporous supporting substrate;
   (b) filling the nanopores of the nanoporous supporting substrate with a filler material; and
   (c) depositing a proton only conducting ceramic layer upon the filled nanoporous supporting substrate.

2. The method of claim 1 further comprising the step of (d) removing the filler material from the nanopores.

3. The method of claim 2 further comprising the step of (e) annealing the substrate and ceramic layer at a temperature of between 550 to 800 degrees Celsius for one hour.

4. The method of claim 1 wherein step (a) the nanoporous supporting substrate is a nanoporous metal layer.

5. The method of claim 4 wherein the nanoporous metal layer is a nanoporous copper layer.

6. The method of claim 1 wherein step (c) the ceramic layer is a doped strontium zirconate.

7. The method of claim 6 wherein the strontium zirconate is doped with a dopant selected from the group consisting of yttrium, indium, neodymium, and scandium.

8. The method of claim 7 wherein step (a) the nanoporous supporting substrate is a nanoporous metal layer.

9. The method of claim 8 wherein the nanoporous metal layer is a nanoporous copper layer.

10. The method of claim 1 wherein the ceramic layer is a ceramic selected from the group consisting of strontium zirconate, barium zirconate, strontium cerate, and barium cerate.

11. The method of claim 1 wherein said ceramic layer has an average pore size of less than or equal to 2 microns.

* * * * *